(12) United States Patent
Rolandson

(10) Patent No.: US 11,781,560 B2
(45) Date of Patent: Oct. 10, 2023

(54) TURBO COMPRESSOR ASSEMBLY

(71) Applicant: Volvo Car Corporation, Gothenburg (SE)

(72) Inventor: Ola Rolandson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/837,184

(22) Filed: Jun. 10, 2022

(65) Prior Publication Data
US 2022/0397054 A1    Dec. 15, 2022

(30) Foreign Application Priority Data
Jun. 14, 2021 (EP) ..................... 21179246

(51) Int. Cl.
| | |
|---|---|
| F04D 29/44 | (2006.01) |
| F04D 29/42 | (2006.01) |
| F04D 29/46 | (2006.01) |
| F02B 37/22 | (2006.01) |
| F02M 35/10 | (2006.01) |

(52) U.S. Cl.
CPC ....... F04D 29/441 (2013.01); F04D 29/4213 (2013.01); F04D 29/464 (2013.01); F02B 37/225 (2013.01); F02M 35/10118 (2013.01); F02M 35/10157 (2013.01); F04D 29/462 (2013.01)

(58) Field of Classification Search
CPC .... F04D 29/423; F04D 29/441; F04D 29/462; F04D 29/464; F02G 37/225; F02M 35/10118; F02M 35/10157
See application file for complete search history.

(56) References Cited

U.S. PATENT DOCUMENTS

| | | | |
|---|---|---|---|
| 2007/0144172 A1* | 6/2007 | Sumser | F02C 7/36 60/599 |
| 2017/0284421 A1* | 10/2017 | Wade | F02M 35/10157 |
| 2019/0170149 A1* | 6/2019 | Hanna | F04D 27/0223 |
| 2019/0264603 A1 | 8/2019 | Hiller | |

FOREIGN PATENT DOCUMENTS

| | | |
|---|---|---|
| DE | 102014006463 A1 | 11/2015 |
| EP | 1452742 A1 | 9/2004 |
| EP | 3534013 A1 | 9/2019 |
| GB | 2580759 A | 7/2020 |

OTHER PUBLICATIONS

Nov. 22, 2021 European Search Report issued in Corresponding International Application No. 21179246.

* cited by examiner

*Primary Examiner* — Audrey B. Walter
(74) *Attorney, Agent, or Firm* — Clements Bernard Walker; Christopher L. Bernard

(57) ABSTRACT

A turbo compressor assembly, a vehicle including such a turbo compressor assembly, and a method for manufacturing such a turbo compressor assembly. The turbo compressor assembly includes an air intake channel, a compressor wheel, an insert unit and an actuator unit. The air intake channel is configured to draw air to the compressor wheel and the compressor wheel is configured to rotate for compressing the drawn air from the intake channel. The insert unit is arranged between the air intake channel and the compressor wheel and configured to control an airflow to the compressor wheel. The actuator unit is connected to the insert unit and configured to move the insert unit at least partially along the air intake channel.

10 Claims, 7 Drawing Sheets

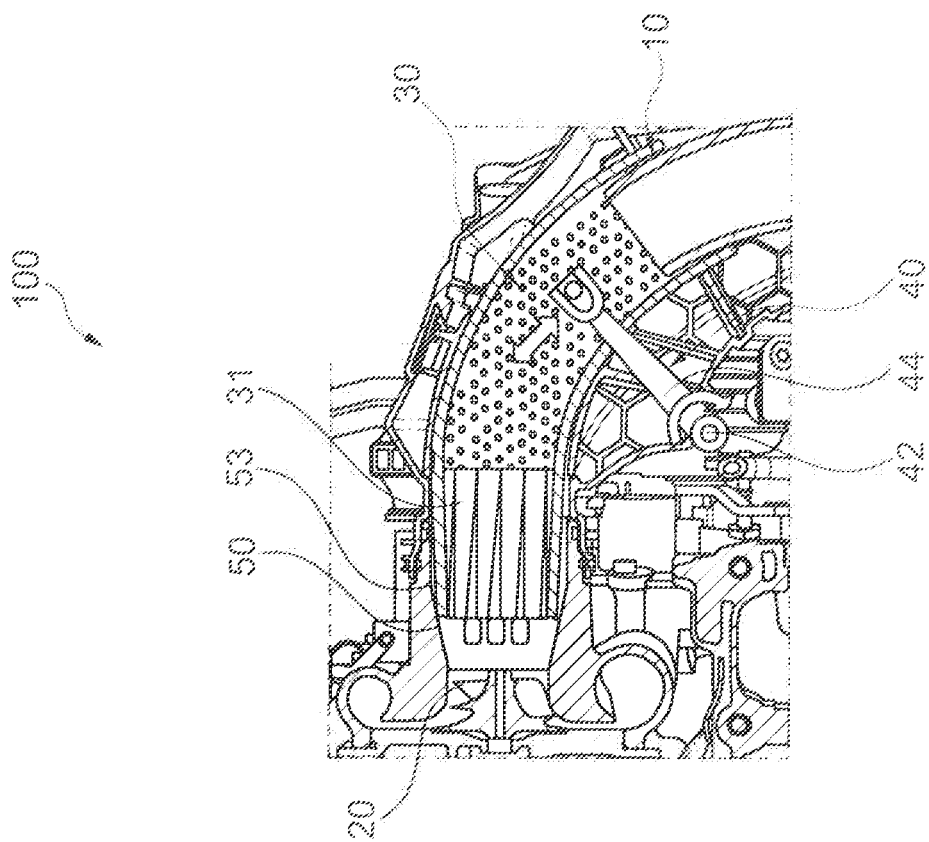
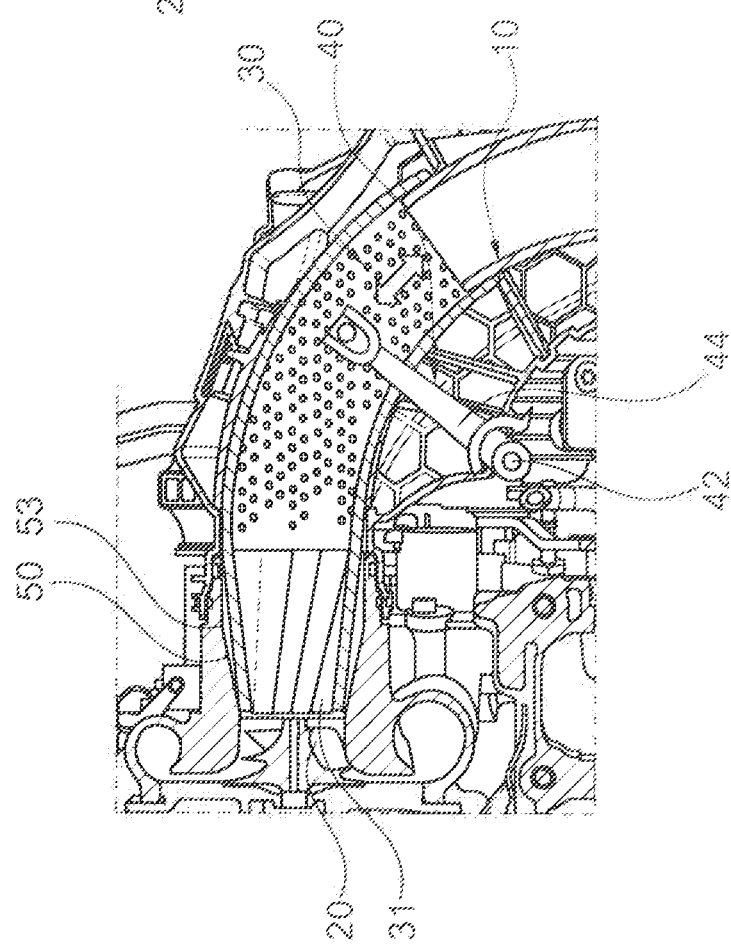

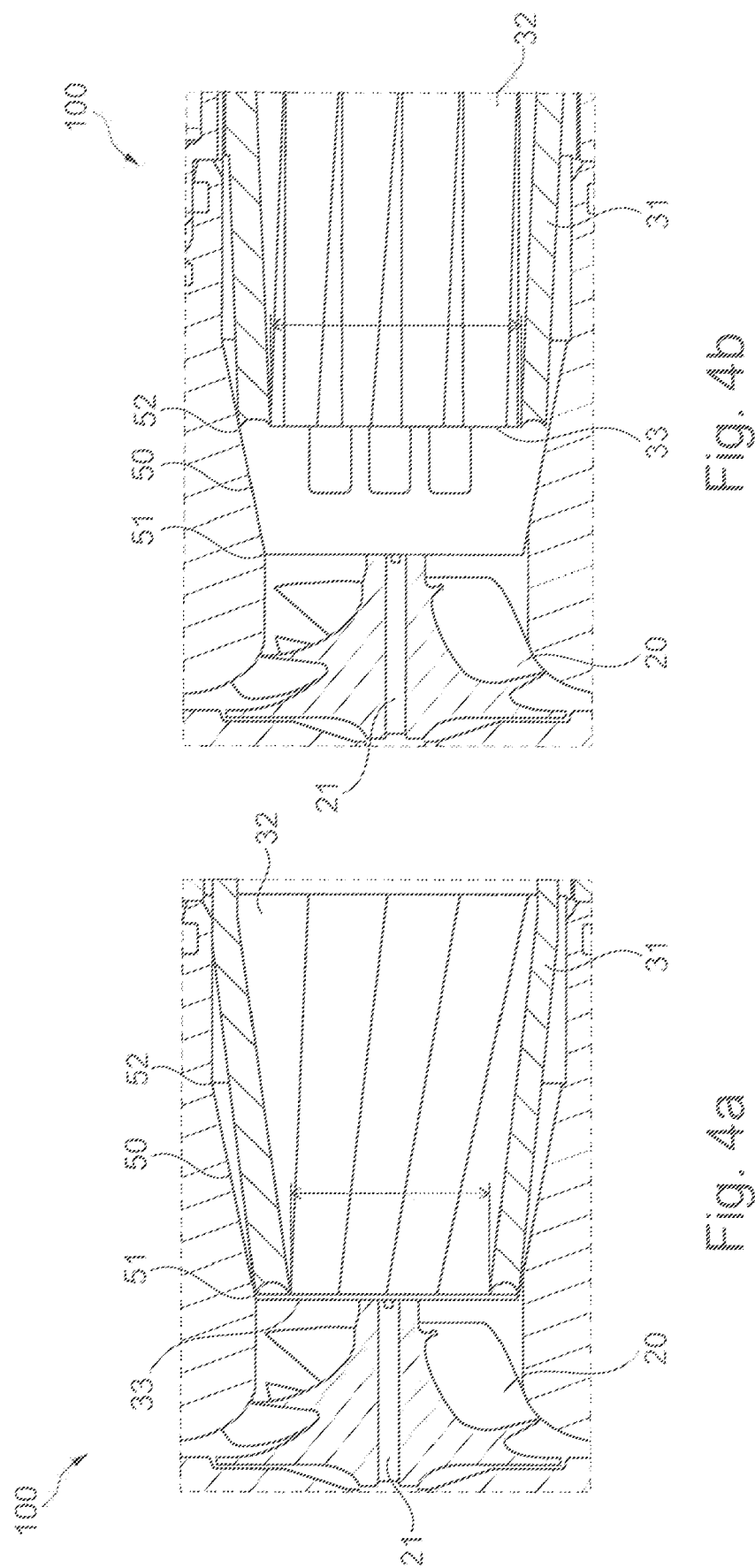

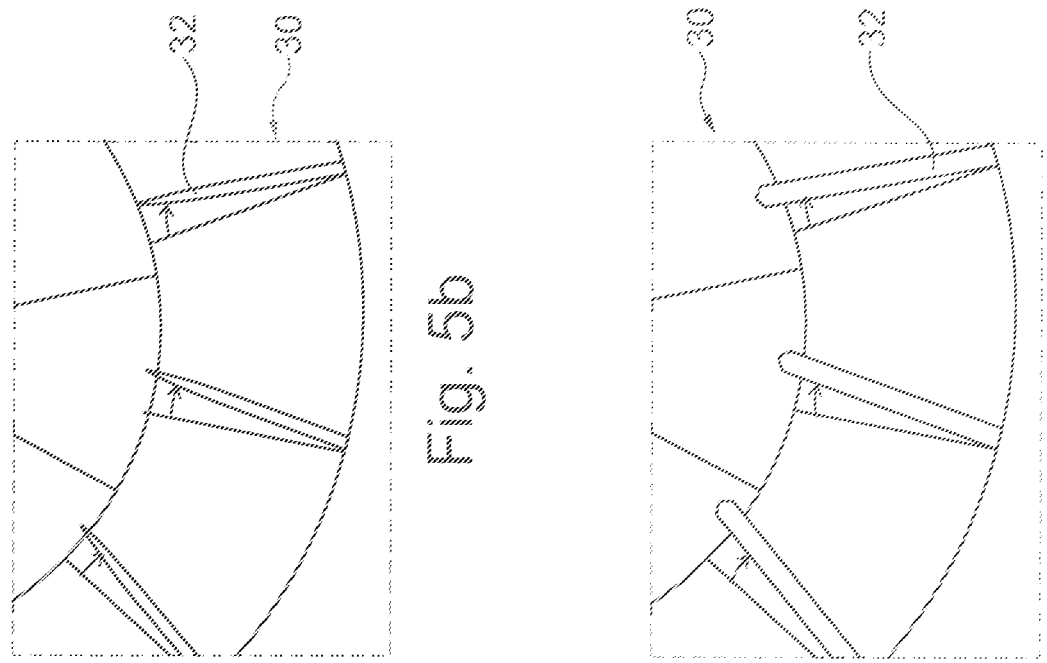
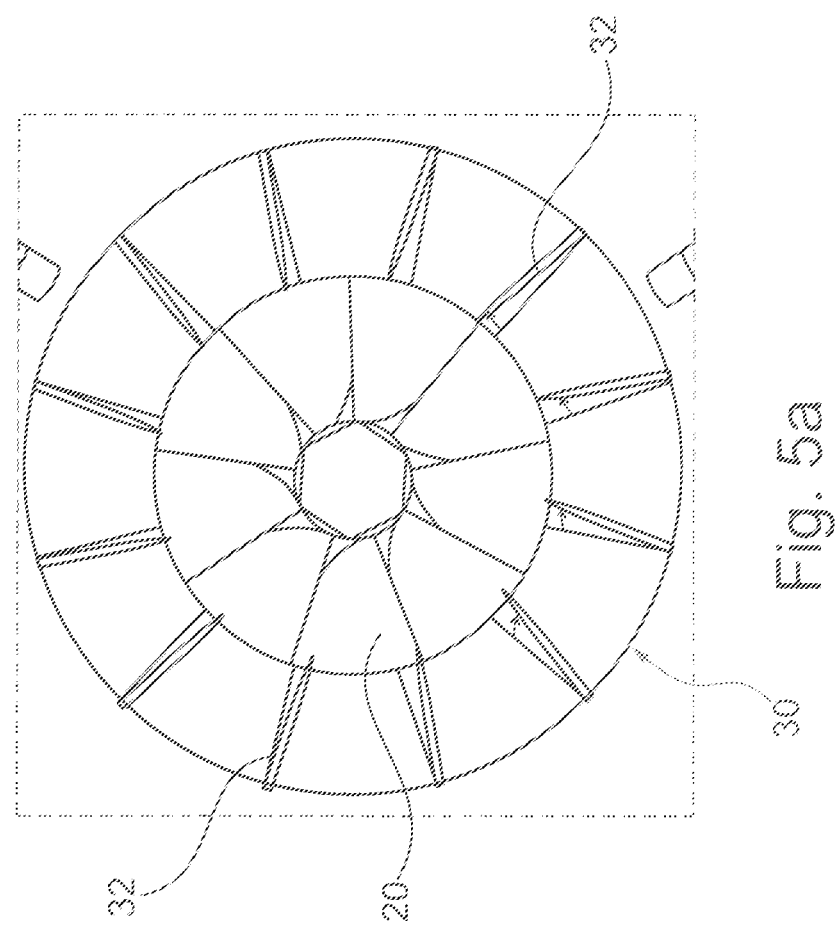

TURBO COMPRESSOR ASSEMBLY

CROSS-REFERENCE TO RELATED APPLICATION

The present disclosure claims the benefit of priority of co-pending European Patent Application No. 21 179 246.0, filed on Jun. 14, 2021, and entitled "Turbo Compressor Assembly," the contents of which are incorporated in full by reference herein.

TECHNICAL FIELD

The present disclosure relates to a turbo compressor assembly, a vehicle including such a turbo compressor assembly, and a method for manufacturing such a turbo compressor assembly.

BACKGROUND

In order to reduce pollutant emissions and to decrease fuel consumption, conventional vehicles include a turbo charger. Generally, the turbo charger utilizes energy of exhaust gas of an internal combustion engine to compress intake air. A conventional turbo charger includes a turbine with an exhaust gas turbine wheel and a compressor with a compressor wheel. The compressor wheel and the exhaust gas turbine wheel are coupled to one another by a solid shaft. The exhaust gas turbine wheel converts energy of the exhaust gas into mechanical energy to drive the compressor wheel, which compresses the intake air into a pressurized air stream. The pressurized air stream is supplied to an inlet manifold on the internal combustion engine to improve performance of the engine.

In the compressor, however, a compressor surge, in other words violent airflow oscillating, may occur, which would decrease an efficiency of the compressor. Additionally, near surge instability may cause wear on bearing components of the turbo charger and noise vibration harshness (NVH) issues of the vehicle when air to be compressed is separated from blades of the compressor wheel and induces flow noise.

SUMMARY

Hence, there may be a need to provide an improved turbo compressor for a turbo charger, which may inhibit compressor surge.

The problem is solved by the subject matter of the present disclosure. It should be noted that the aspects of the disclosure described in the following apply to the turbo compressor assembly, the vehicle including such a turbo compressor assembly, and the method for manufacturing such a turbo compressor assembly.

According to the present disclosure, a turbo compressor assembly is presented. The turbo compressor assembly includes an air intake channel, a compressor wheel, an insert unit and an actuator unit. The air intake channel is configured to draw air to the compressor wheel and the compressor wheel is configured to rotate for compressing the drawn air from the air intake channel. The insert unit is arranged between the air intake channel and the compressor wheel and configured to control an airflow to the compressor wheel. The actuator unit is connected to the insert unit and configured to move the insert unit at least partially along the air intake channel.

The turbo compressor assembly according to the present disclosure may control a speed of the drawn air through the air intake channel by variably positioning the insert unit between the air intake channel and the compressor wheel by means of the actuator unit. The insert unit may adapt the air speed at both of high mass flow rate and low mass flow rate at the compressor wheel. Accordingly, a compressor surge may be reduced or even avoided and a stable air supply to the compressor wheel can be achieved. Further, such a turbo compressor assembly may be integrated in a conventional turbo charger, which may lead to saving of manufacturing costs and time.

A turbo charger may include the turbo compressor assembly and a turbine assembly. The compressor wheel of the turbo compressor assembly may be rotated by a shaft connected to the turbine assembly. On an opposite side of the shaft relative to the compressor wheel, the air intake channel may be arranged to guide air in direction to the compressor wheel. In other words, air may be drawn to the compressor wheel through the air intake channel by rotating the compressor wheel. The compressor wheel may further pressurize the intake air into the compressor wheel by rotating. The terms "intake air", "drawn air", "airflow" may be understood as ambient air sucked in the air intake channel due to rotation of the compressor wheel.

The insert unit may face the compressor wheel and at least partially extend in the air intake channel. The actuator unit may be fixedly mounted at the insert unit to allow a movement of the insert unit between the air intake channel and the compressor wheel. The actuator unit may include an electric actuator. The actuator may allow the insert unit to approach to the compressor wheel and/or retreat from the compressor wheel. Accordingly, the insert unit may adjust the speed of the air drawn through the air intake channel and control an airflow property such laminate, turbulent, backflow, surge or the like with respect to the mass flow rate at the compressor wheel.

In an example, the turbo compressor assembly further includes a transition element between the compressor wheel and the air intake channel, wherein the insert unit is movable along an inner surface of the transition element. The transition element may connect the compressor wheel and the air intake channel. The transition element may be a part of the air intake channel or additionally mounted between the compressor wheel and the air intake channel. The insert unit may be arranged adjacent to the inner surface of the transition element and may be guided by the inner surface of the transition element when moving between the compressor wheel and the air intake channel.

In an example, the transition element includes a first end portion and a second end portion, the first end portion faces the compressor wheel and the second end portion faces the air intake channel An inner diameter of the first end portion is smaller than an inner diameter of the second end portion of the transition element.

In other words, the transition element may be formed in a conical shape, wherein the inner diameter of the transition element may be gradually reduced in the direction of the compressor wheel or gradually increased in the direction of the air intake channel. Accordingly, if the insert unit moves along the inner surface of the transition element, a size of an air outlet of the insert unit facing the compressor wheel may vary along the inner diameter of the transition element. This may affect the speed of intake air directed to the compressor wheel from the insert unit and/or the air intake channel.

A working range of the turbo charger may have two limits—a choke range for high mass flow rates and a compressor surge range for low mass flow rates. The compressor surge may lead to instabilities in the turbo charger with appearance of reversed flow at a compressor wheel air inlet. Deep surge may be even dangerous due to mechanical damages caused by these instabilities. For instance, the compressor surge may occur when the mass flow rate of the compressor wheel is higher than the speed of the intake air, particularly at a low mass flow rate. By varying a diameter of the air outlet of the insert unit facing the compressor wheel, the speed of the intake air may be adjusted. Consequently, forming of the compressor surge may be suppressed.

In particular, at a low mass flow rate of the compressor wheel, the insert unit may be positioned directly ahead of the compressor wheel or at the first end portion of the transition element, at which the diameter of the air outlet of the insert unit facing the compressor wheel is decreased. Accordingly, the speed of the air drawn into the compressor wheel may be increased, i.e. adapted to the low mass flow rate of the compressor wheel. In contrast, at a high mass flow rate of air at the compressor wheel, the air outlet of the insert unit facing the compressor wheel may be positioned apart from the compressor wheel or at the second end portion of the transition element. Accordingly, the diameter of the air outlet of the insert unit facing the compressor wheel may be increased and the speed of the air directed to the compressor wheel may be decreased and/or adapted to the high mass flow rate of the compressor wheel. Hence, the speed of drawn air to the compressor wheel through the air intake channel may be adjusted according to the mass flow rate of the air at the compressor wheel and formation of the compressor surge may be avoided.

Alternatively, the first end portion of the transition element facing the compressor wheel may be bigger than the second end portion of the transition element facing the air intake channel.

In an example, the actuator unit includes a linear actuator configured to linearly move the insert unit parallel to a rotation axis of the compressor wheel. In other words, the actuator unit may be mounted at the insert unit on an extension of or parallel to the rotation axis of the compressor wheel. Thus, the actuator unit may move the insert unit linearly along a rotation axis of the compressor wheel. Thus, the insert unit may be approached to or retreated from the compressor wheel linearly relative to the compressor wheel. At least a portion of the insert unit may extend beyond the air intake channel in case the air intake channel includes a helical shape. The actuator unit may be coupled with the insert unit by means of a metal bushing and the actuator unit may be air-tightly sealed such that the airflow inside the air intake channel may not be leaked.

Alternatively, the actuator unit may include a rotating actuator configured to move the insert unit in a radial direction of the air intake channel. In case of the helically shaped air intake channel, the insert unit may be guided along the air intake channel by means of the rotating actuator. The actuator unit with the rotating actuator may additionally include a rotating actuator arm fixed connected to the insert unit, which has a rotatable movement along the air intake channel.

In an example, the insert unit includes a guiding means facing the compressor wheel. The guiding means is configured to induce pre-swirl of the airflow ahead of the compressor wheel. The guiding means may be arranged in the transition element between the first end portion and second end portion thereof. Preferably, the guiding means may be arranged at the air outlet of the insert unit. The term "pre-swirl" may be understood as the airflow reinforced by pre-turning in a radial direction of the compressor wheel, before the intake air enters the compressor wheel. Accordingly, the guiding means may support the insert unit to prevent from forming the compressor surge.

In an example, the guiding means including several tab elements arranged around the rotation axis of the compressor wheel and substantially parallel to the rotation axis of the compressor wheel. Each of the tab elements may be formed as a blade or vane, wherein their surface may be curved. The plurality of the tab elements may be arranged in a cylinder shape substantially parallel to the insert element and/or the air intake channel. The term "substantially parallel" may be understood that each tab element may be aligned parallel to the rotation axis of the compressor wheel or with a slight inclination in the direction of the rotation axis of the compressor wheel. Hence, the guiding means may be configured to vary its diameter with respect to the position of an air outlet facing the compressor wheel between the first end portion and the second end portion of the transition element.

In an example, the tab elements are arranged inclined in a rotation direction of the compressor wheel. Accordingly, the tab elements extending from the along the rotation axis of the compressor wheel may be arranged in a spiral form to direct the drawn air from the air intake channel in a radial direction of the compressor wheel. Hence, the airflow into the compressor wheel may be stabilized and a risk for the compressor surge may be reduce or remove.

In an example, each of the tab elements includes a ridge or fin shape projected inwardly of the guiding means. Each of the tab elements may include an edge portion extending substantially parallel to the rotation axis of the compressor wheel or in a longitudinal direction of the tab elements. Additionally, the edge portions may be also arranged in the rotation direction of the compressor wheel. Each edge portion may include a ridge shape or fin shape projected inwardly of the guiding means. Such tab elements ensure generating reliable pre-swirl and preventing from forming the compressor surge.

Alternatively, the edge portions of the tab elements may also include a groove extending in the longitudinal direction of the tab elements. It is also possible only some tab elements include the ridge or fin shape and/or other tab elements include the groove.

In an example, the tab elements are arranged in a closed position if the guiding means is positioned adjacent to the first end portion of the transition element. At a low mass flow rate of the compressor wheel, the guiding means of the insert unit may be arranged at the first end portion of the transition element. Since the transition element may include a conical shape, the insert unit, particularly the guiding means arranged along the inner surface of the transition element may be configured to vary its diameter corresponding to the diameter of the transition element. Hence, if the guiding means is positioned at the first end portion of the transition element, which may have the smallest diameter of the transition element, the tab elements may be adapted such that it may be also arranged with the smallest diameter. To provide the smallest diameter of the guiding means, gaps between the tab elements may be closed and/or the tab elements may be superimposed upon each other.

In an example, the tab elements are configured to gradually open along a movement of the insert unit from the first end portion to the second end portion of the transition element. Due to the conical shape of the transition element, the guiding means may expand with respect to the movement of the insert unit along the inner surface of the transition element. The tab elements may be, hence, gradually open the gaps to increase the diameter of the guiding means.

In an example, the insert unit includes at least one hinge element. The hinge element is connected to a spring element arranged at an inner wall of the air intake channel. The spring element is configured to press the hinge element inwardly of the air intake channel.

The hinge element may be configured to engage the tab elements together in position, even if an opposite side of the tab elements facing the compressor wheel may open or close along the movement of the insert unit. The hinge element may be further configured to adjust an open ratio of the tab elements along the movement of the insert unit between the compressor wheel and the air intake channel.

The hinge element may include a first hinge section and a second hinge section. The first hinge section may surround the tab elements and the second hinge section may be arranged adjacent to the inner wall of the air intake channel. The first hinge section and the second hinge section may be coupled to each other by means of snap-fit. At an engaging position of the first hinge section and the second hinge section, the tab elements may be fixedly held. Hence, the tab elements may not directly contact the inner wall of the air intake channel, which would otherwise damage the tab elements.

The spring element arranged at the inner wall of the air intake channel may press the hinge element. Preferably, the second hinge section may be pressed inwardly of the air intake channel as the insert unit moves from the first end portion to the second end portion of the transition element, which would lead to an expansion of the first hinge section. Accordingly, the tab elements biased by the first hinge section at the first end position of the transition unit may open gradually, as the insert unit retreats away from the compressor wheel, which may induce pre-swirl effectively at a high mass flow rate of the compressor wheel.

Additionally or alternatively, the insert unit with the tab elements in the closed position may have a bigger diameter than the first end portion of the transition element such that the tab elements continuously press the inner surface of the transition element. In other words, the tab elements may be preloaded against the inner surface of the transition element. As the insert unit moves from the first end portion to the second end portion of the transition element, the tab elements may gradually open.

In an example, the air intake channel includes at least one blocking element at the inner wall. The blocking element is configured to limit the movement of the insert unit inside the air intake channel. The blocking element may be arranged in a radial direction of the air intake channel. The insert unit may include a latch element arranged at least partially around an outer surface of the insert unit. As the insert unit moves away from the compressor wheel, the latch element of the insert unit may approach to and engage with the blocking element of the air intake channel, which may block further movement of the insert unit in the opposite direction of the compressor wheel. Alternatively, the hinge element of the insert unit may be engaged with the blocking element to limit the movement of the insert unit inside the air intake channel.

In an example, the insert unit includes a recirculation means along a circumferential edge facing the compressor wheel. The recirculation means may be arranged at an outer edge of the insert unit facing the compressor wheel. The recirculation means may be configured to prevent a backflow of the pressurized air from the compressor wheel. A high pressure ratio over the compressor wheel may cause a backflow in the gap between the compressor wheel and a diffusor arranged behind the compressor wheel. The backflow may induce a vortex in front of the compressor wheel that blocks a laminar airflow. By arranging the recirculation means, turbulence induced, particularly at a low mass flow rate, may be reduced and allow higher resistance against compressor surge. The recirculation means may be formed as a groove in a circumferential direction of the outer edge of the insert unit. Alternatively, the circumferential edge of the insert unit facing the compressor wheel may be inclined outwardly or inwardly relative to the rotation axis of the compressor wheel to avoid the backflow of the pressurized air.

According to the present disclosure, a vehicle is presented. The vehicle includes a turbo compressor assembly as described above. In such a vehicle, a compressor surge may be reduced or even avoided and a stable air intake through the compressor wheel can be achieved. Hence, an efficiency of the turbo charger, consequently the vehicle can be improved.

According to the present disclosure, a method for manufacturing a turbo compressor assembly is presented. The method includes, not necessarily in this order,
    arranging an insert unit between an air intake channel and a compressor wheel, and
    connecting an actuator unit to the insert unit.

The air intake channel is configured to draw air to the compressor wheel. The compressor wheel is configured to rotate for compressing the drawn air. The insert unit is configured to control an airflow to the compressor wheel, and the actuator unit is configured to move the insert unit at least partially along the air intake channel.

It should be noted that the above embodiments may be combined with each other irrespective of the aspect involved. Accordingly, the method may be combined with structural features and, likewise, the system may be combined with features described above with regard to the method.

These and other aspects of the present embodiments will become apparent from and elucidated with reference to the embodiments described hereinafter.

BRIEF DESCRIPTION OF THE DRAWINGS

Exemplary embodiments will be described in the following with reference to the following drawings.

FIG. 3a, FIG. 3b show schematically and exemplarily an embodiment of a turbo compressor assembly according to the present disclosure.

FIG. 4a, FIG. 4b show schematically and exemplarily an embodiment of a guiding means assembly according to the present disclosure.

FIG. 5a, FIG. 5b, FIG. 5c show schematically and exemplarily an embodiment of a guiding means assembly according to the present disclosure.

DESCRIPTION OF EMBODIMENTS

Figure 1:
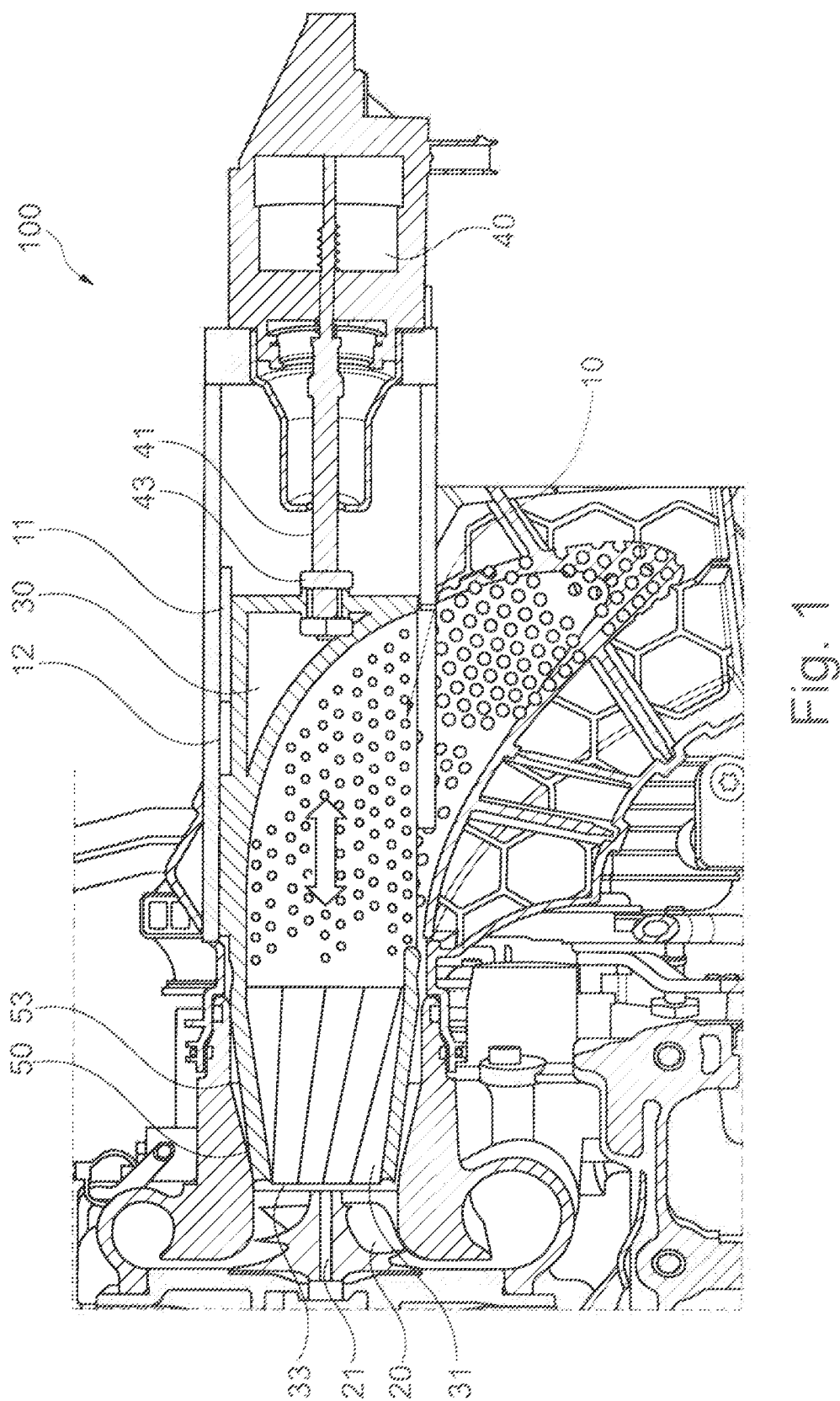
FIG. 1 shows schematically and exemplarily an embodiment of a turbo compressor assembly according to the present disclosure.
Figure 2:
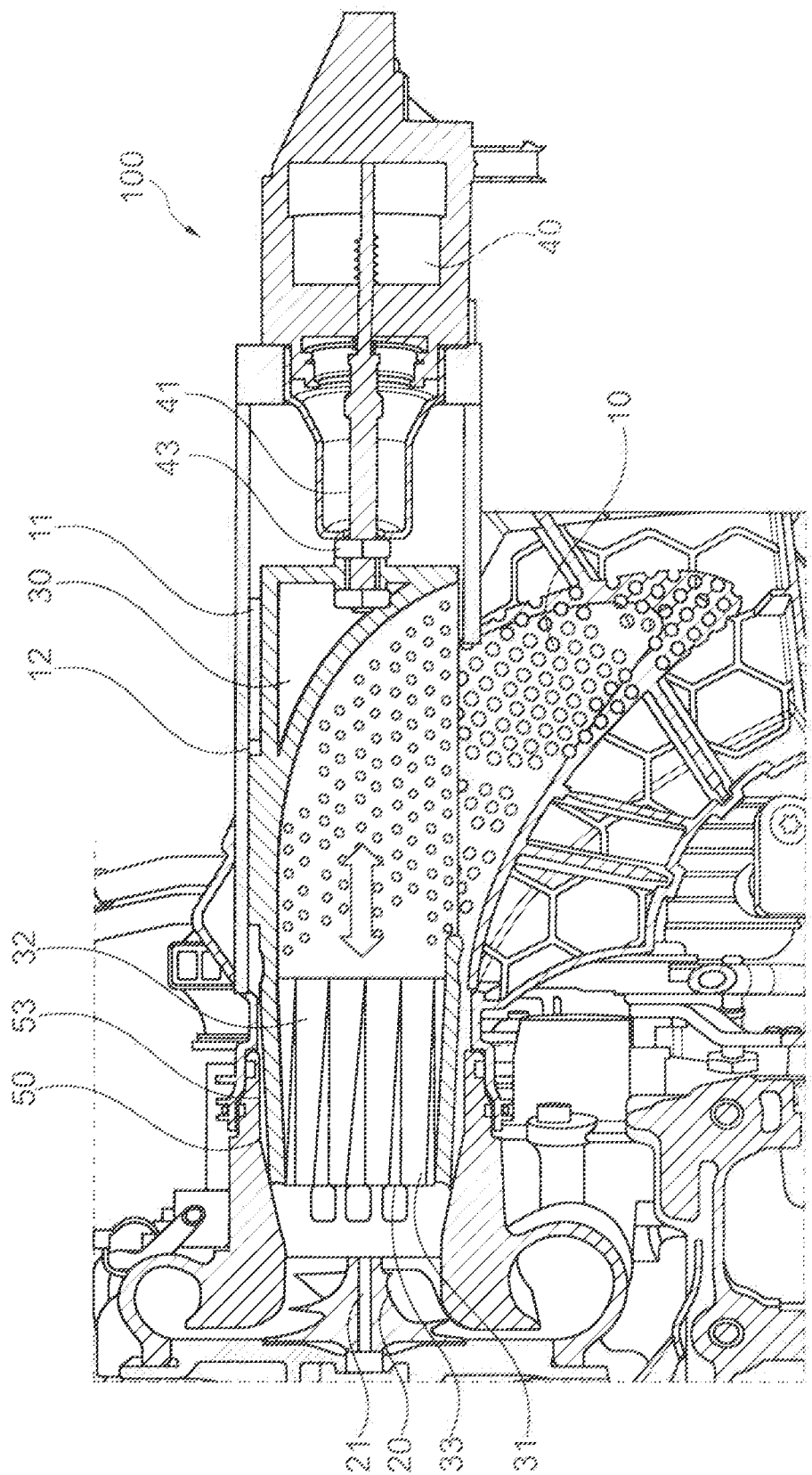
FIG. 2 shows schematically and exemplarily an embodiment of a turbo compressor assembly according to the present disclosure.

FIG. 1 and FIG. 2 show a turbo compressor assembly 100 for a turbo charger (not shown) in a vehicle (not shown). The turbo charger includes the turbo compressor assembly 100 and a turbine assembly (not shown). The turbo compressor assembly 100 includes an air intake channel 10, a compressor wheel 20, an insert unit 30 and an actuator unit 40. The compressor wheel 20 is rotatable by a shaft 21 connected to the turbine assembly. On an opposite side of the shaft 21 relative to the compressor wheel 20, the air intake channel 10 is arranged. The air intake channel 10 is configured to draw air to the compressor wheel 20 and the compressor wheel 20 is configured to rotate for compressing the intaken air from the air intake channel 10. The air intake channel 10 may be helically formed.

The turbo compressor assembly 100 further includes a transition element 50 between the compressor wheel 20 and the air intake channel 10. The transition element 50 includes a first end portion 51 and a second end portion 52 (see also FIG. 4a, FIG. 4b). The first end portion 51 faces the compressor wheel 20 and the second end portion 52 facing the air intake channel 10. The transition element 50 has a conical shape such that an inner diameter of the first end portion 51 being smaller than an inner diameter of the second end portion 52 of the transition element 50. The insert unit 30 faces the compressor wheel 20 on one side and at least partially extend in the air intake channel 10 on the other side. The insert unit 30 is movable along an inner surface 53 of the transition element 50.

The actuator unit 40 is fixedly connected to the insert unit 30 and allows the insert unit 30 to move between the transition element 50 and at least partially along the air intake channel 10. The actuator unit 40 includes a linear actuator 41 configured to move the insert unit 30 parallel to a rotation axis of the compressor wheel 20. In other words, the insert unit 30 may be positioned at the first end portion 51 of the transition element 50 (see FIG. 1) or linearly retreated away from the compressor wheel 20 (see FIG. 2) by the actuator unit 40. The actuator unit 40 is coupled with the insert unit 30 by means of a metal bushing 43 and air-tightly sealed such that the air streaming inside the air intake channel 10 may not be leaked.

Alternatively, the actuator unit 40 includes rotating actuator 42 configured to move the insert unit 30 in a radial direction of the air intake channel 10. Since the air intake channel 10 includes a helical shape, the insert unit 30 may be guided along with the air intake channel 10 by means of the rotating actuator 42. The actuator unit 40 with the rotating actuator 42 may additionally include a rotating actuator arm 44 fixed connected to the insert unit 30, which has a rotatable movement along the air intake channel 10 (see FIG. 3a, FIG. 3b).

The air intake channel 10 includes at least one blocking element 11 at its inner wall 12. The blocking element 11 is configured to limit the movement of the insert unit 30. The blocking element 11 is configured to limit the movement of the insert unit 30. The blocking element 11 is arranged in a radial direction of the air intake channel 10. The insert unit 30 includes a latch element arranged at least partially around an outer surface of the insert unit 30. As the insert unit 30 moves away from the compressor wheel 20, the latch element of the insert unit 30 may engage with the blocking element 11 of the air intake channel 10, which may block further movement of the insert unit 30 in the opposite direction of the compressor wheel 20.

The insert unit 30 includes a guiding means 31 facing the compressor wheel 20. In other words, the guiding means 31 is arranged in the transition element 50 between the first end portion 51 and second end portion 52 thereof. The guiding means 31 is configured to provide pre-swirl in front of the compressor wheel 20 before drawn air is delivered into the compressor wheel 20.

The guiding means 31 includes several tab elements 32 arranged around the rotation axis of the compressor wheel 20 and substantially parallel to the rotation axis of the compressor wheel 20. Each of the tab elements 32 may be formed as a blade or vane, wherein their surface may be curved. The plurality of the tab elements 32 are arranged in a cylinder shape substantially parallel to the insert element 30 and/or the air intake channel 10. The guiding means 31 may vary its diameter with respect to the position of an air outlet 33 facing the compressor wheel 20 between the first end portion 51 and the second end portion 52 of the transition element 50 (see FIG. 4a, FIG. 4b).

The tab elements 32 are arranged inclined in a rotation direction of the compressor wheel 20. Preferably, an inclination direction of the tab elements 32 corresponds to the rotation direction of the compressor wheel 20 to provide stabilized airflow to the compressor wheel 20. Each of the tab elements 32 includes a ridge or fin shape projected inwardly of the guiding means 31 (see FIG. 5a, FIG. 5b and FIG. 5c). Such edge structure of the tab elements 32 enhances inducing pre-swirl.

The tab elements 32 are arranged in a closed position if the guiding means 31 is positioned adjacent to the first end portion 51 of the transition element 50 (see FIG. 4a). The tab elements 32 are configured to gradually open along a movement of the insert unit 30 from the first end portion 51 to the second end portion 52 of the transition element 50 (see FIG. 4b).

At a low mass flow rate of the compressor wheel 20, the guiding means 31 is arranged at the first end portion 51 of the transition element 50 as shown in FIG. 4a. Since the transition element 50 is conically shaped, the insert unit 30 positioned at the first end portion 51 of the transition element 50, which has the smallest diameter of the transition element 50, the tab elements 32 are closed and/or superimposed upon each other to reduce the diameter of the guiding means 31. Additionally, as the mass flow rate of the compressor wheel 20 increases, the tab elements 32 expand along the movement of the insert unit 30 in direction of the air intake channel 10. Subsequently, the guiding means 31 may include a larger diameter in the open position than in the closed position.

In the closed position of the tab elements 32, a speed of the air drawn into the compressor wheel 20 may be increased, i.e. adapted to the low mass flow rate of the compressor wheel 20. In contrast, in the open position of the tab elements 32, the speed of the air drawn into the compressor wheel 20 may be decreased. Hence, the speed of intake air to the compressor wheel 20 through the air intake channel 10 may be adjusted according to the mass flow rate of the air at the compressor wheel 20 and the compressor surge may be avoided.

Figure 6:
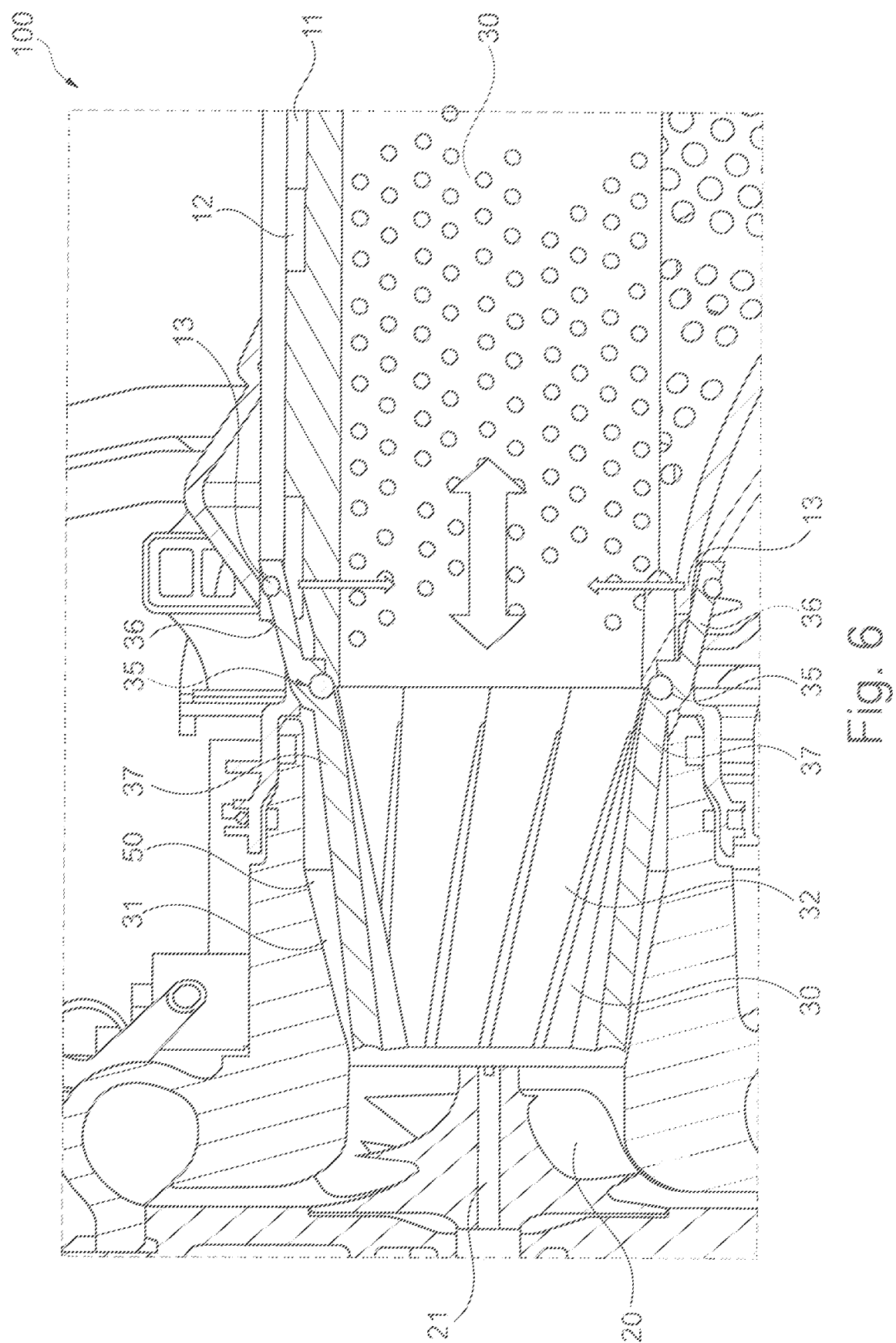
FIG. 6 shows schematically and exemplarily an embodiment of a turbo compressor assembly according to the present disclosure.

As shown in FIG. 6, the insert unit 30 includes at least one hinge element 35. The hinge element 35 is connected to a spring element 13 arranged at an inner wall of the air intake channel 10. The spring element 13 is configured to press the hinge element 35 inwardly of the air intake channel 10. The hinge element 35 is configured to engage the tab elements 32 together in position, even if an opposite side of the tab elements 32 facing the compressor wheel 20 may open or close along the movement of the insert unit 30. The hinge element 35 is further configured to adjust an open ratio of the tab elements 32 along the movement of the insert unit 30 between the compressor wheel 20 and the air intake channel 10.

The hinge element 35 includes a first hinge section 36 and a second hinge section 37. The first hinge section 36 surrounds the tab elements 32 and the first hinge section 37 is arranged adjacent to the inner wall of the air intake channel 10. The first hinge section 36 and the first hinge section 37 are coupled by means of snap-fit. At an engaging position of the first hinge section 36 and the first hinge section 37, the tab elements 32 may be fixedly held. Hence, the tab elements 32 may not directly contact the inner wall of the air intake channel 10, which would otherwise damage the engaging portion of the tab elements 32.

The spring element 13 arranged at the inner wall of the air intake channel 10 presses the hinge element 35, preferably the first hinge section 37 inwardly of the air intake channel 10 as the insert unit 30 moves from the first end portion 51 to the second end portion 52 of the transition element 50. Accordingly, the tab elements 32 biased by the first hinge section 36 at the first end position of the transition unit may open gradually, as the insert unit 30 retreats away from the compressor wheel 20, which may induce pre-swirl effectively at a high mass flow rate of the compressor wheel 20.

Figure 7A:
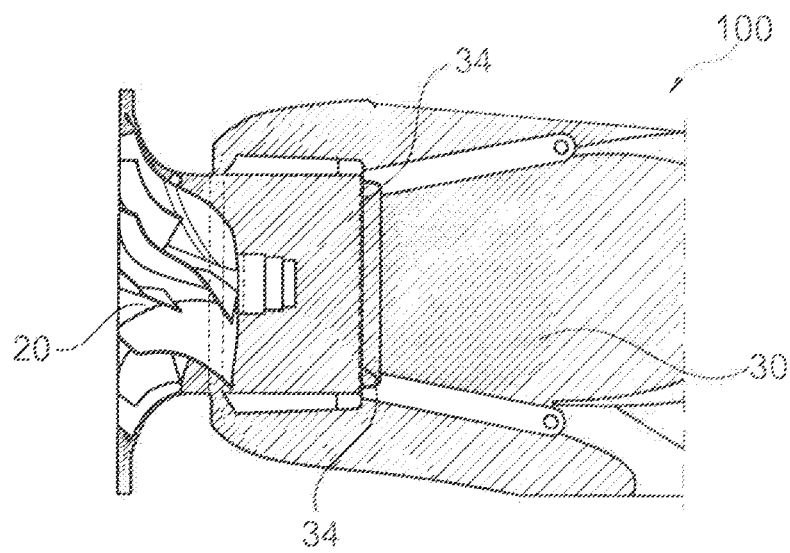
FIG. 7a, FIG. 7b, FIG. 7c show schematically and exemplarily an embodiment of a turbo compressor assembly according to the present disclosure.
Figure 7B:
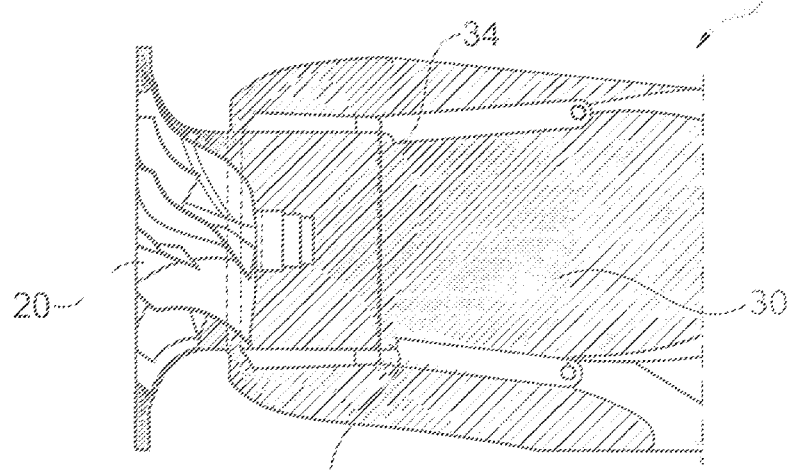
Figure 7C:
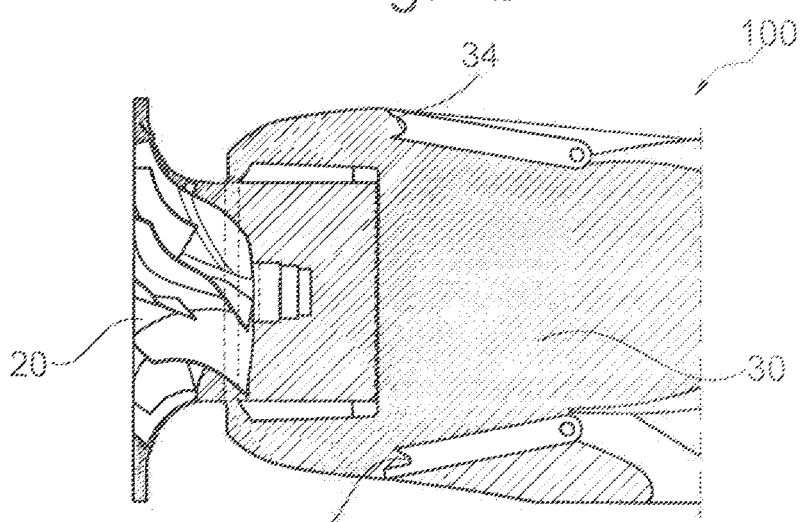

Additionally or alternatively, the insert unit 30 has a bigger diameter than the first end portion 51 of the transition element 50 such that the tab element continuously presses the inner surface of the transition element 50 in the closed position. In other words, the tab elements 32 may be preloaded against the inner surface of the transition element 50. As the insert unit 30 moves from the first end portion 51 to the second end portion 52 of the transition element 50, the tab elements 32 may gradually open. FIG. 7a shows the hinge element 35 arrangement at a high mass flow rate of the compressor wheel 20, FIG. 7b shows the hinge element 35 arrangement at a peak efficiency of the compressor wheel 20, and FIG. 7c shows the hinge element 35 arrangement at a low mass flow rate of the compressor wheel 20.

The insert unit 30 further includes a recirculation means 34 along a circumferential edge facing the compressor wheel 20 (see FIG. 5). The recirculation means 34 is arranged at an outer edge of the insert unit 30 facing the compressor wheel 20. The recirculation means 34 is configured to inhibit a backflow of the pressurized air from the compressor wheel 20. The recirculation means 34 is formed as a groove in a circumferential direction of the outer edge of the insert unit 30. Alternatively, the circumferential edge of the insert unit 30 facing the compressor wheel 20 may be inclined outwardly or inwardly relative to the rotation axis of the compressor wheel 20 to avoid the backflow of the pressurized air.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A turbo compressor assembly, comprising:
an air intake channel,
a compressor wheel,
a transition element between the compressor wheel and the air intake channel, the transition element comprising a first end portion and a second end portion, the first end portion facing the compressor wheel and the second end portion facing the air intake channel, an inner diameter of the first end portion being smaller than an inner diameter of the second end portion,
an insert unit, and
an actuator unit,
the air intake channel being configured to draw air to the compressor wheel,
the compressor wheel being configured to rotate for compressing the drawn air,
the insert unit being arranged between the air intake channel and the compressor wheel and configured to control an airflow to the compressor wheel,
the actuator unit being connected to the insert unit and configured to move the insert unit at least partially in an inner wall of the air intake channel and along an inner surface of the transition element,
the insert unit comprising a guiding means facing the compressor wheel, the guiding means being configured to induce pre-swirl of the airflow ahead of the compressor wheel,
the guiding means comprising several tab elements, the tab elements being arranged around a rotation axis of the compressor wheel and substantially parallel to the rotation axis of the compressor wheel, and
the tab elements being arranged inclined in a rotation direction of the compressor wheel.

2. The turbo compressor assembly according to claim 1, the actuator unit comprising a linear actuator configured to linearly move the insert unit parallel to a rotation axis of the compressor wheel.

3. The turbo compressor assembly according to claim 1, each of the tab elements comprising a ridge or fin shape projected inwardly of the guiding means.

4. The turbo compressor assembly according to claim 1, the insert unit comprising at least one hinge element, the hinge element being connected to a spring element arranged at an inner wall of the air intake channel, the spring element being configured to press the hinge element inwardly of the air intake channel.

5. The turbo compressor assembly according to claim 1, the air intake channel comprising at least one blocking element at the inner wall of the air intake channel, the blocking element being configured to limit the movement of the insert unit.

6. The turbo compressor assembly according to claim 1, the insert unit comprising a recirculation means along a circumferential edge facing the compressor wheel.

7. The turbo compressor assembly according to claim 1, the tab elements being arranged in a closed position if the guiding means is positioned adjacent to the first end portion of the transition element.

8. The turbo compressor assembly according to claim 7, the tab elements being configured to gradually open along a movement of the insert unit from the first end portion to the second end portion of the transition element.

9. A vehicle, comprising:
a turbo compressor assembly, comprising:
an air intake channel,
a compressor wheel,
a transition element between the compressor wheel and the air intake channel, the transition element comprising a first end portion and a second end portion, the first end portion facing the compressor wheel and the second end portion facing the air intake channel, an inner diameter of the first end portion being smaller than an inner diameter of the second end portion,
an insert unit, and
an actuator unit,
the air intake channel being configured to draw air to the compressor wheel,
the compressor wheel being configured to rotate for compressing the drawn air,
the insert unit being arranged between the air intake channel and the compressor wheel and configured to control an airflow to the compressor wheel,
the actuator unit being connected to the insert unit and configured to move the insert unit at least partially in an inner wall of the air intake channel and along an inner surface of the transition element,
the insert unit comprising a guiding means facing the compressor wheel, the guiding means being configured to induce pre-swirl of the airflow ahead of the compressor wheel,
the guiding means comprising several tab elements, the tab elements being arranged around a rotation axis of the compressor wheel and substantially parallel to the rotation axis of the compressor wheel, and
the tab elements being arranged inclined in a rotation direction of the compressor wheel.

10. A method for manufacturing a turbo compressor assembly, comprising:
arranging an insert unit between an air intake channel and a compressor wheel,
providing a transition element between the compressor wheel and the air intake channel, the transition element comprising a first end portion and a second end portion, the first end portion facing the compressor wheel and the second end portion facing the air intake channel, an inner diameter of the first end portion being smaller than an inner diameter of the second end portion, and
connecting an actuator unit to the insert unit,
the air intake channel being configured to draw air to the compressor wheel,
the compressor wheel being configured to rotate for compressing the drawn air,
the insert unit being configured to control an airflow to the compressor wheel,
the actuator unit being configured to move the insert unit at least partially in an inner wall of the air intake channel and along an inner surface of the transition element,
the insert unit comprising a guiding means facing the compressor wheel, the guiding means being configured to induce pre-swirl of the airflow ahead of the compressor wheel,
the guiding means comprising several tab elements, the tab elements being arranged around a rotation axis of the compressor wheel and substantially parallel to the rotation axis of the compressor wheel, and
the tab elements being arranged inclined in a rotation direction of the compressor wheel.

* * * * *